(12) United States Patent
Zhou et al.

(10) Patent No.: US 11,088,750 B2
(45) Date of Patent: Aug. 10, 2021

(54) FEEDBACK OF BEAM SWITCH TIME CAPABILITY

(71) Applicant: QUALCOMM Incorporated, San Diego, CA (US)

(72) Inventors: Yan Zhou, San Diego, CA (US); Tao Luo, San Diego, CA (US); Valentin Alexandru Gheorghiu, Tokyo (JP); Raghu Challa, San Diego, CA (US); Ruhua He, San Diego, CA (US); Yong Li, San Diego, CA (US); Timo Ville Vintola, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 127 days.

(21) Appl. No.: 16/274,359

(22) Filed: Feb. 13, 2019

(65) Prior Publication Data

US 2019/0260456 A1    Aug. 22, 2019

Related U.S. Application Data

(60) Provisional application No. 62/633,068, filed on Feb. 20, 2018, provisional application No. 62/710,456, filed on Feb. 16, 2018.

(51) Int. Cl.
    *H04B 7/06*     (2006.01)
    *H04L 1/18*     (2006.01)
    (Continued)

(52) U.S. Cl.
    CPC ........... *H04B 7/0695* (2013.01); *H04B 7/088* (2013.01); *H04B 7/0877* (2013.01); *H04L 1/18* (2013.01); *H04W 24/08* (2013.01)

(58) Field of Classification Search
None
See application file for complete search history.

(56) References Cited

U.S. PATENT DOCUMENTS 10,327,154 B2 * 6/2019 Nagaraja ............... H04W 16/28
2010/0195754 A1   8/2010 Li et al.
(Continued)

FOREIGN PATENT DOCUMENTS

WO    WO-2018028470 A1    2/2018

OTHER PUBLICATIONS

Huawei., et al., "CSI-RS Design for Beam Management", 3GPP Draft; R1-1704235, 3rd Generation Partnership Project (3GPP), Mobile Competence Centre, 650, Route Des Lucioles; F-06921 Sophia-Antipolis Cedex, France, vol. RAN WG1,No. Spokane, USA; Apr. 3, 2017-Apr. 7, 2017, Apr. 2, 2017 (Apr. 2, 2017), 9 Pages, XP051242387, Retrieved from the Internet: URL: http://www.3gpp.org/ftp/Meetings_3GPP_SYNC/RAN1/Docs/ [retrieved on Apr. 2, 2017], Chapter 2.3.

(Continued)

*Primary Examiner* — Andrew C Oh
(74) *Attorney, Agent, or Firm* — Patterson & Sheridan, L.L.P.

(57) ABSTRACT

Certain aspects of the present disclosure relate to methods and apparatus for providing beam switch latency using communications systems operating according to new radio (NR) technologies. For example, the method generally includes determining a latency associated with a beam switch from a source antenna array module to a target antenna array module when the target module is in a low power mode; and signaling a base station to use the determined latency after sending a command for the beam switch.

40 Claims, 10 Drawing Sheets

(51) Int. Cl.
*H04W 24/08* (2009.01)
*H04B 7/08* (2006.01)

(56) References Cited

U.S. PATENT DOCUMENTS

| | | | | |
|---|---|---|---|---|
| 2010/0330959 A1* | 12/2010 | Mildh | ...... | H04W 8/22 455/410 |
| 2012/0008510 A1* | 1/2012 | Cai | ...... | H04B 7/0404 370/252 |
| 2013/0142054 A1* | 6/2013 | Ahmadi | ...... | H04B 7/024 370/252 |
| 2014/0105204 A1* | 4/2014 | Bengtsson | ...... | H04B 7/0814 370/345 |
| 2015/0003310 A1* | 1/2015 | Ko | ...... | H04W 52/0225 370/311 |
| 2015/0222331 A1* | 8/2015 | Zhang | ...... | H04B 7/0874 375/267 |
| 2016/0065290 A1* | 3/2016 | Zhu | ...... | H04W 72/0413 370/329 |
| 2016/0119958 A1* | 4/2016 | Tan | ...... | H04B 7/0617 370/336 |
| 2017/0005707 A1 | 1/2017 | Islam et al. | | |
| 2017/0135111 A1* | 5/2017 | Nishimoto | ...... | H04W 72/0473 |
| 2017/0215087 A1* | 7/2017 | Amizur | ...... | H04W 16/28 |
| 2017/0215117 A1* | 7/2017 | Kwon | ...... | H04B 7/0408 |
| 2017/0244456 A1* | 8/2017 | Kim | ...... | H04B 17/102 |
| 2017/0251441 A1* | 8/2017 | Axnas | ...... | H04B 7/0632 |
| 2017/0302341 A1 | 10/2017 | Yu et al. | | |
| 2017/0318541 A1* | 11/2017 | Islam | ...... | H04B 7/0617 |
| 2017/0359826 A1* | 12/2017 | Islam | ...... | H04W 72/042 |
| 2017/0374703 A1* | 12/2017 | Sang | ...... | H04W 48/08 |
| 2018/0054832 A1* | 2/2018 | Luo | ...... | H04W 72/1284 |
| 2018/0083753 A1* | 3/2018 | Nagaraja | ...... | H04L 5/0048 |
| 2018/0084440 A1* | 3/2018 | Nagaraja | ...... | H04B 7/0628 |
| 2018/0084441 A1* | 3/2018 | Nagaraja | ...... | H04B 7/0617 |
| 2018/0098255 A1* | 4/2018 | Murugan | ...... | H04W 8/24 |
| 2018/0123668 A1* | 5/2018 | Kwak | ...... | H04L 5/0092 |
| 2018/0124819 A1* | 5/2018 | Kwon | ...... | H04W 72/046 |
| 2018/0146419 A1* | 5/2018 | Raghavan | ...... | H04B 7/0456 |
| 2018/0184270 A1* | 6/2018 | Chun | ...... | H04W 24/08 |
| 2018/0191416 A1* | 7/2018 | Palenius | ...... | H04W 76/28 |
| 2018/0199212 A1* | 7/2018 | Lin | ...... | H04B 7/005 |
| 2018/0227031 A1* | 8/2018 | Guo | ...... | H04B 7/0695 |
| 2018/0234959 A1* | 8/2018 | Ahn | ...... | H04W 72/042 |
| 2018/0269947 A1* | 9/2018 | Levitsky | ...... | H04B 7/0626 |
| 2018/0279286 A1* | 9/2018 | Akoum | ...... | H04W 72/046 |
| 2018/0330223 A1* | 11/2018 | Xiao | ...... | G06Q 20/3278 |
| 2018/0351618 A1* | 12/2018 | Ho | ...... | H04B 7/0632 |
| 2019/0022279 A1 | 1/2019 | Alghazali et al. | | |
| 2019/0044578 A1* | 2/2019 | Rao | ...... | H04B 7/043 |
| 2019/0052331 A1* | 2/2019 | Chang | ...... | H04B 7/0626 |
| 2019/0076663 A1* | 3/2019 | Andersen | ...... | A61N 1/36125 |
| 2019/0090185 A1* | 3/2019 | Rune | ...... | H04W 52/0209 |
| 2019/0109687 A1* | 4/2019 | Takeda | ...... | H04B 7/088 |
| 2019/0110210 A1* | 4/2019 | Takeda | ...... | H04B 7/08 |
| 2019/0150003 A1* | 5/2019 | He | ...... | H04B 7/086 342/368 |
| 2019/0165894 A1* | 5/2019 | Choi | ...... | H04B 17/24 |
| 2019/0199412 A1* | 6/2019 | Koskela | ...... | H04W 72/0446 |
| 2019/0200337 A1* | 6/2019 | Zhou | ...... | H04B 7/0617 |
| 2019/0222279 A1* | 7/2019 | Xi | ...... | H04B 7/0491 |
| 2019/0223174 A1* | 7/2019 | Shimizu | ...... | H04B 7/0695 |
| 2019/0230569 A1* | 7/2019 | Kim | ...... | H04W 88/08 |
| 2019/0260458 A1* | 8/2019 | Zhou | ...... | H04B 7/0626 |
| 2019/0280784 A1* | 9/2019 | Kwak | ...... | H04B 7/088 |
| 2019/0281510 A1* | 9/2019 | Yilmaz | ...... | H04W 36/0058 |
| 2019/0312668 A1* | 10/2019 | Park | ...... | H04L 5/00 |
| 2019/0349915 A1* | 11/2019 | Ahn | ...... | H04B 7/0695 |
| 2019/0356438 A1* | 11/2019 | Lee | ...... | H04B 7/0408 |
| 2019/0356439 A1* | 11/2019 | Lee | ...... | H04B 7/0408 |
| 2019/0362522 A1* | 11/2019 | Han | ...... | A61B 5/7267 |
| 2019/0372710 A1* | 12/2019 | Chen | ...... | H04W 72/04 |
| 2019/0379431 A1* | 12/2019 | Park | ...... | H04W 72/04 |
| 2019/0386714 A1* | 12/2019 | Yang | ...... | H04W 72/04 |
| 2019/0387441 A1* | 12/2019 | Koskela | ...... | H04W 36/30 |
| 2019/0393968 A1* | 12/2019 | Ioffe | ...... | H04B 17/14 |
| 2020/0021413 A1* | 1/2020 | Park | ...... | H04L 5/0026 |
| 2020/0045725 A1* | 2/2020 | Mochizuki | ...... | H04W 72/046 |
| 2020/0067583 A1* | 2/2020 | Shin | ...... | H04B 7/0486 |
| 2020/0077320 A1* | 3/2020 | Shimoda | ...... | H04L 5/001 |
| 2020/0112355 A1* | 4/2020 | Park | ...... | H04B 7/0626 |
| 2020/0128479 A1* | 4/2020 | Xu | ...... | H04W 8/24 |
| 2020/0204316 A1* | 6/2020 | Zhang | ...... | H04L 5/0051 |
| 2020/0221319 A1* | 7/2020 | Kang | ...... | H04W 72/046 |
| 2021/0083825 A1* | 3/2021 | Choi | ...... | H04L 5/0023 |

OTHER PUBLICATIONS

International Search Report and Written Opinion—PCT/US2019/017936—ISA/EP—dated May 20, 2019.

Samsung: "Discussion on Beam Indication for POSCH", 3GPP Draft; R1-1714513, 3rd Generation Partnership Project (3GPP), Mobile Competence Centre, 650, Route Des Lucioles; F-06921 Sophia-Antipolis Cedex, France, vol. RAN WG1,No. Prague, Czech; Jun. 21, 2017-Jun. 25, 2017, Aug. 20, 2017 (Aug. 20, 2017), 4 Pages, XP051317288, Retrieved from the Internet: URL: http://www.3gpp.org/ftp/Meetings_3GPP_SYNC/RAN1/Docs/ [retrieved on Aug. 20, 2017], Chapter 2 and Chapter 3.

* cited by examiner

FEEDBACK OF BEAM SWITCH TIME CAPABILITY

CLAIM OF PRIORITY UNDER 35 U.S.C. § 119

This application claims the benefit of U.S. Provisional Patent application Ser. No. 62/710,456, filed Feb. 16, 2018, and U.S. Provisional Patent application Ser. No. 62/633,068, filed Feb. 20, 2018, which are herein incorporated by reference in their entirety.

FIELD OF THE DISCLOSURE

The present disclosure relates generally to communication systems, and more particularly, to methods and apparatus for providing beam switch latency using communications systems operating according to new radio (NR) technologies.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes determining a latency associated with a beam switch from a source antenna array module to a target antenna array module when the target module is in a low power mode, and signaling a base station to use the determined latency after sending a command for the beam switch.

Certain aspects provide a method for wireless communication by a network entity. The method generally includes receiving, from a user equipment, an indication of a beam switch latency associated with a beam switch at the UE from a source antenna array module to a target antenna, sending a beam switch command to the UE, and applying the indicated beam switch latency after sending the beam switch command.

Aspects generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
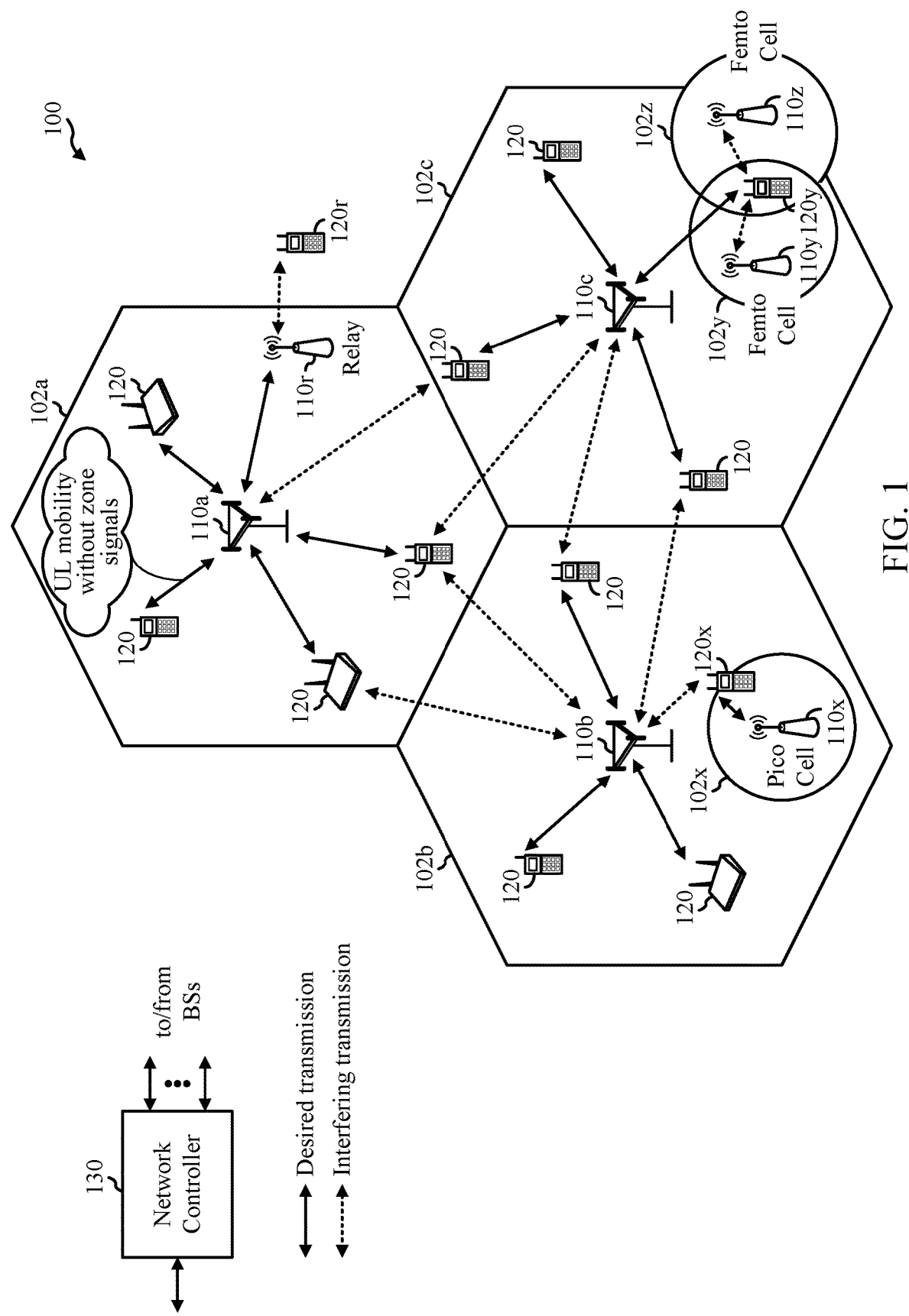
FIG. 1 is a block diagram conceptually illustrating an example telecommunications system, in which aspects of the present disclosure may be performed.

Aspects of the present disclosure provide apparatus, methods, processing systems, and computer readable mediums for NR (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example, MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16, . . . slots) depending on the tone-spacing (e.g., 15, 30, 60, 120, 240 . . . kHz). NR may utilize OFDM with a CP on the uplink and downlink and include support for half-duplex operation using time division duplex (TDD). A single component carrier bandwidth of 100 MHz may be supported. NR resource blocks may span 12 subcarriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (e.g., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
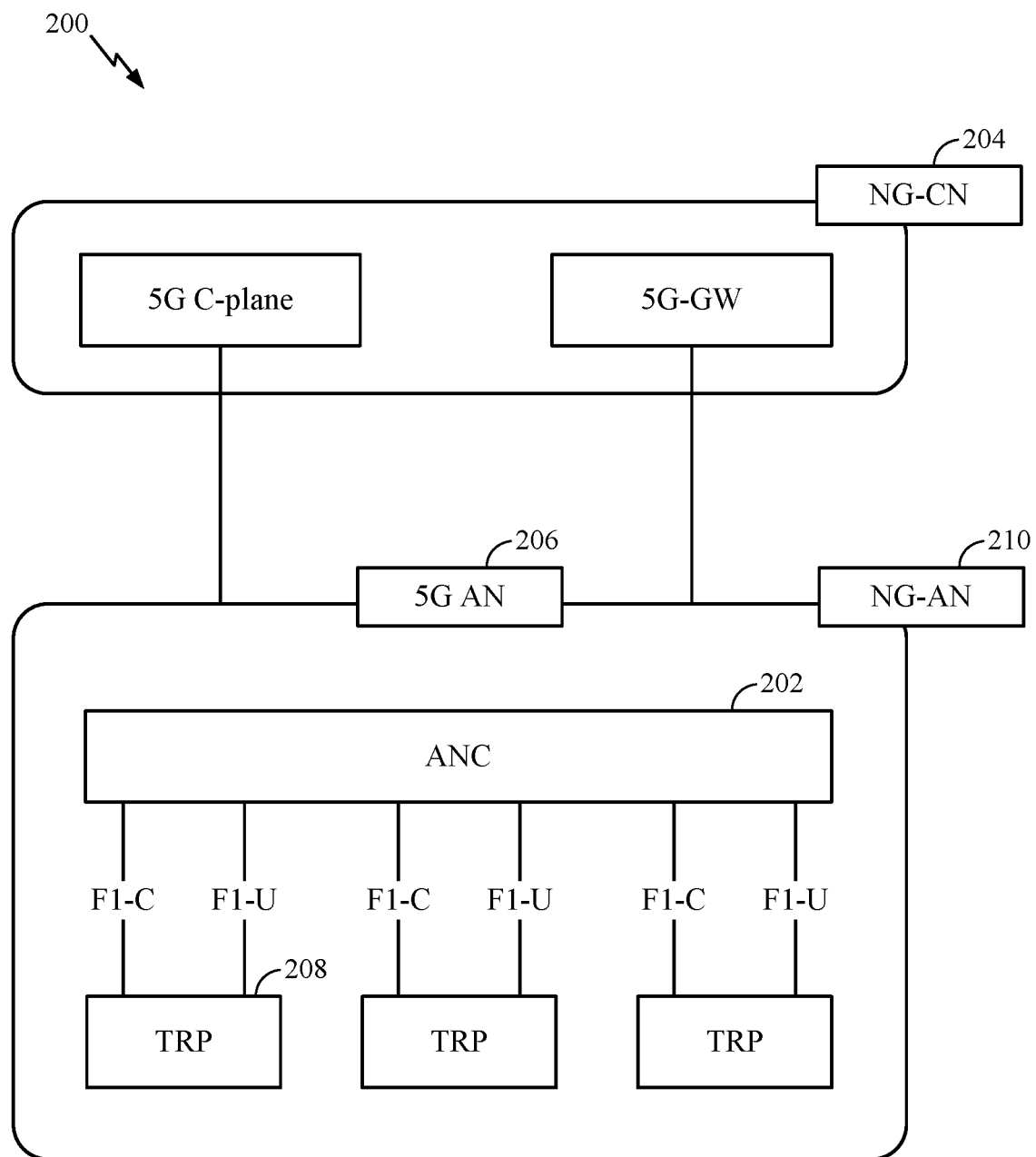
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
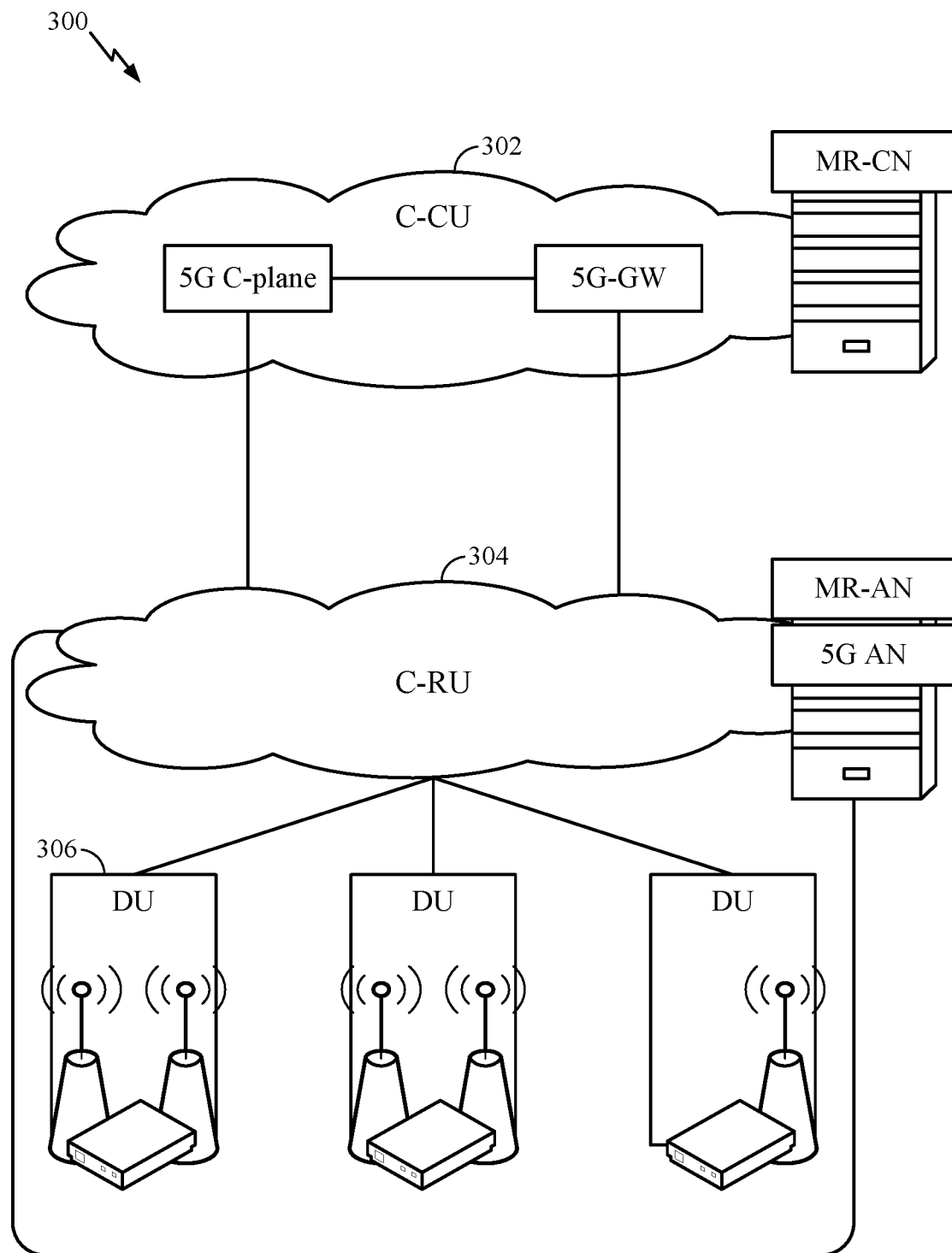
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
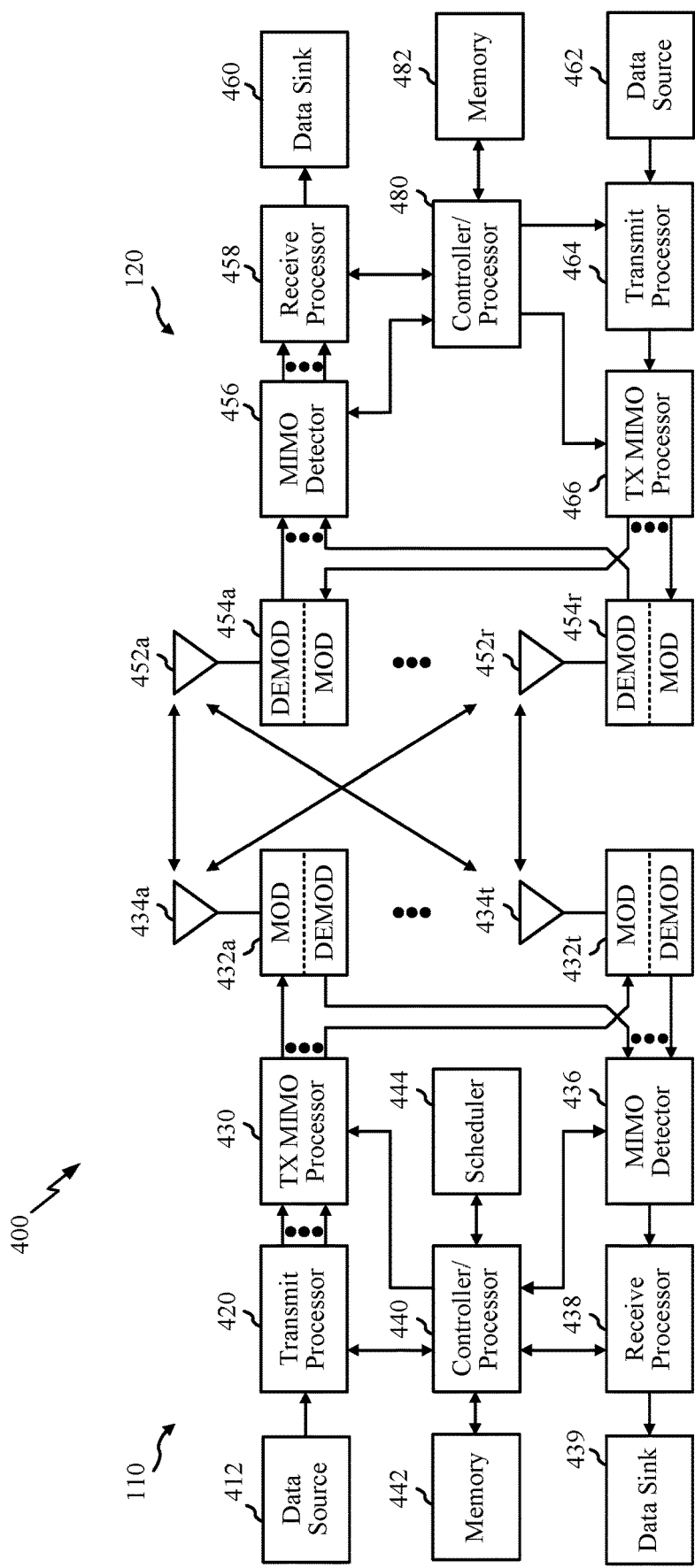
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, processors 466, 458, 464, and/or controller/processor 480 of the UE 120 and/or antennas 434, processors 430, 420, 438, and/or controller/processor 440 of the BS 110 may be used to perform the operations described herein and illustrated with reference to FIGS. 9 and 10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
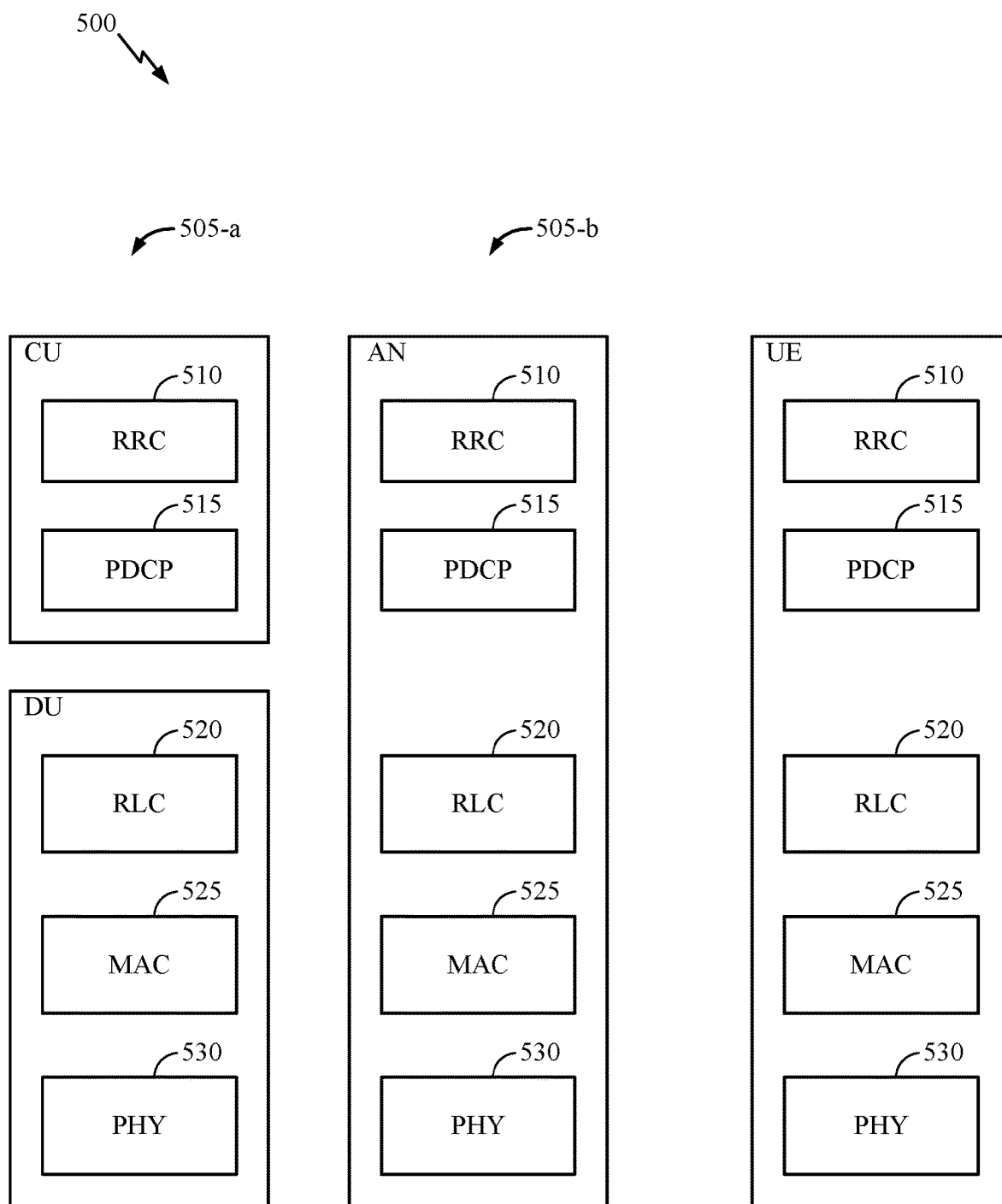
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
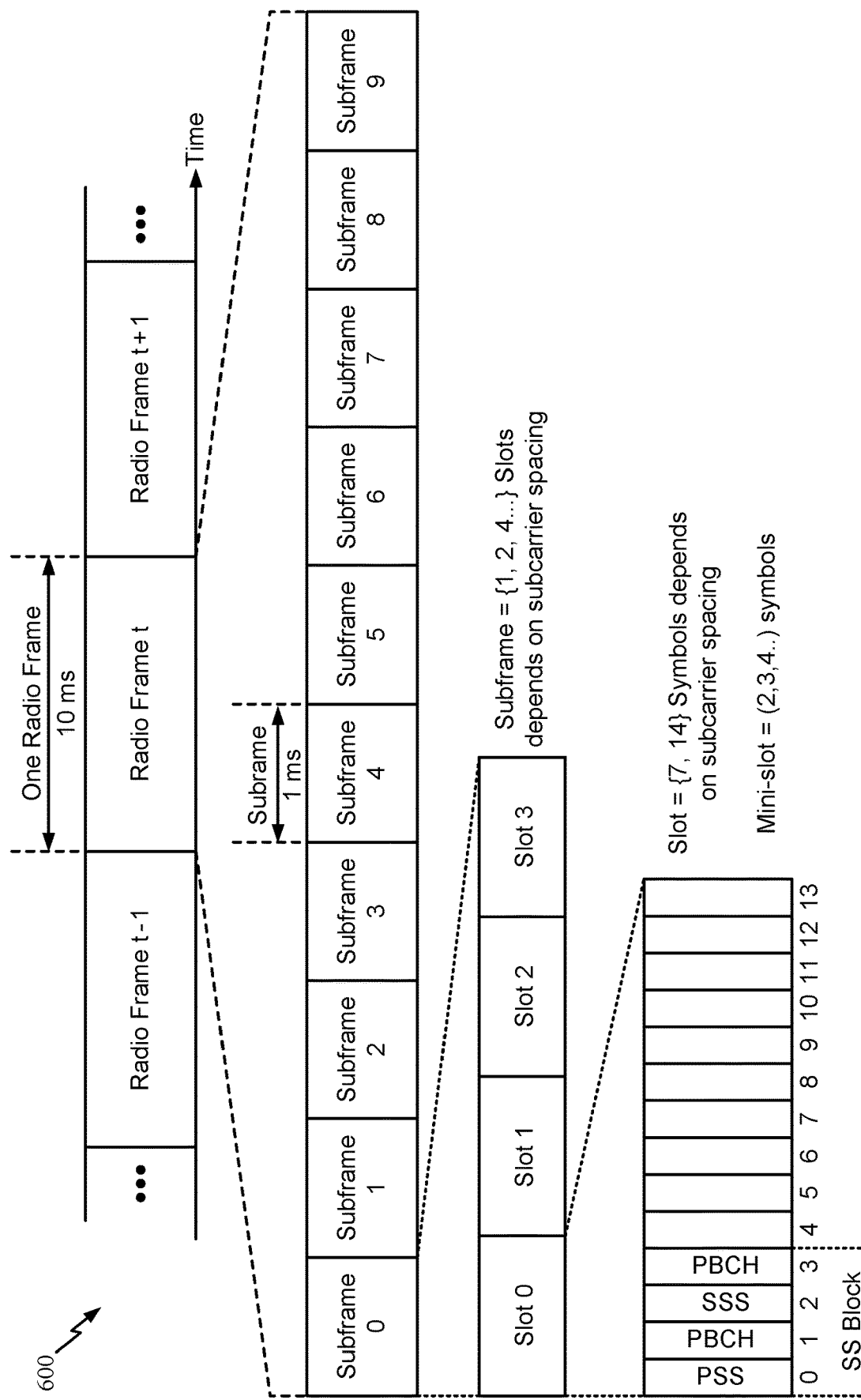
FIG. 6 illustrates an example of a frame format for a new radio (NR) system, in accordance with certain aspects of the present disclosure

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Examples of Antenna Array Module Mode Adjustments

A UE may have a number of different antenna array modules provided at different locations on or within the UE to optimize transmission and reception, for example, while the UE is in different locations and/or orientations. The arrangement of each antenna module (or panel) may vary depending on the specific UE and the number, size, and other properties of each of the modules.

Figure 7:
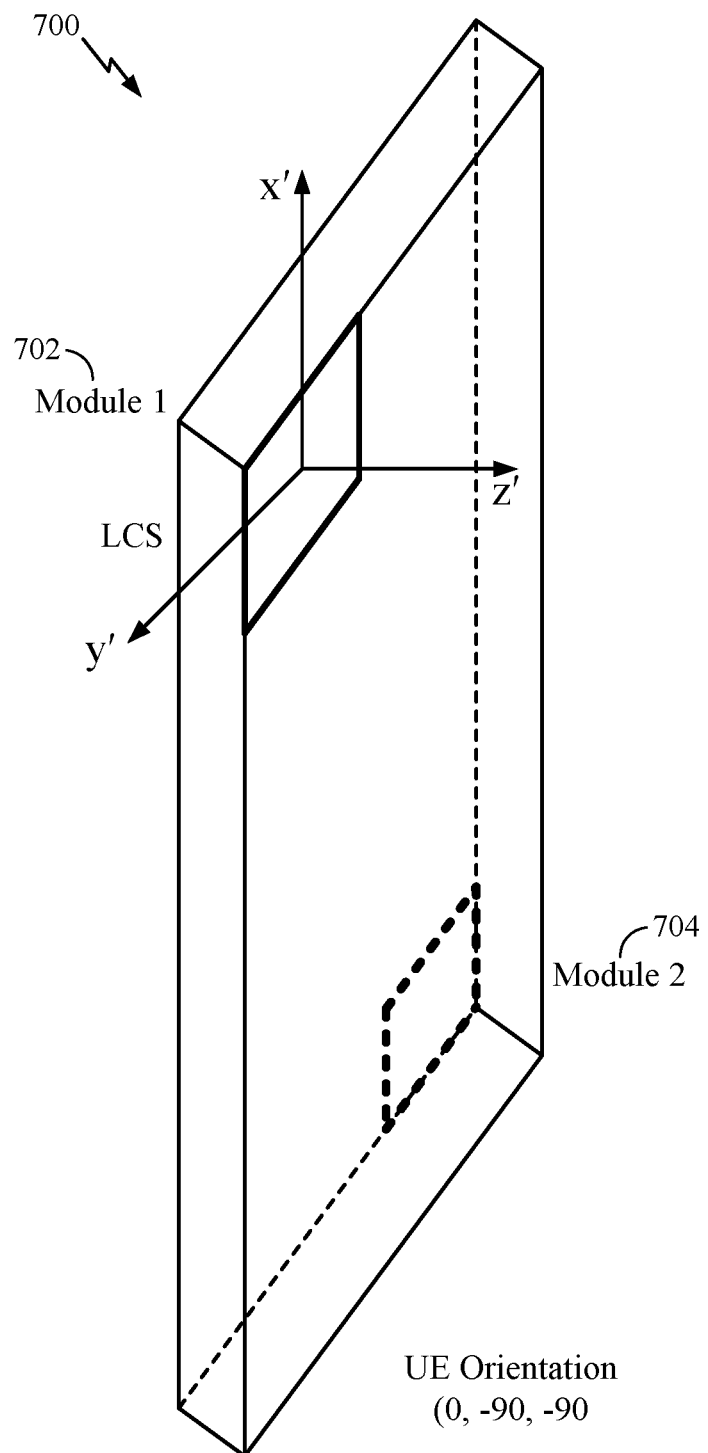
FIG. 7 illustrates an example of antenna array module placement on a UE, in accordance with aspects of the present disclosure.

An example of a UE 700 and one possible configuration of antenna array module placement, in accordance with aspects of the present disclosure, is shown in FIG. 7. As shown in this embodiment, the UE 700 includes two modules 702 and 704. The first of the modules, labeled Module 1 (702), is shown located on a front surface of the UE 700 in the upper left corner of the device. Additionally, the second module, labeled Module 2 (704), is shown located on a back surface on a bottom right corner of the UE device 700.

To save power, a UE, such as the UE 700 shown in FIG. 7, may only keep one antenna array module (or some subset of antenna array modules) in a powered up wake (serving) mode, while keeping other antenna array modules in a low power (sleep) mode. Beam switch latency (from a first beam to a second beam) within a same powered up module is typically short and predictable. For example, a beam switch latency may be around or less than 250 us from receiving a downlink control information (DCI) with a beam switch command to actual completion of the beam switch. However, beam switch latency across wakeup and sleep modules (from a first beam associated with a powered up module to a second beam associated with a powered down module) depends on UE capability and the low power (sleep) type, e.g. deep sleep/light sleep.

Figure 8:
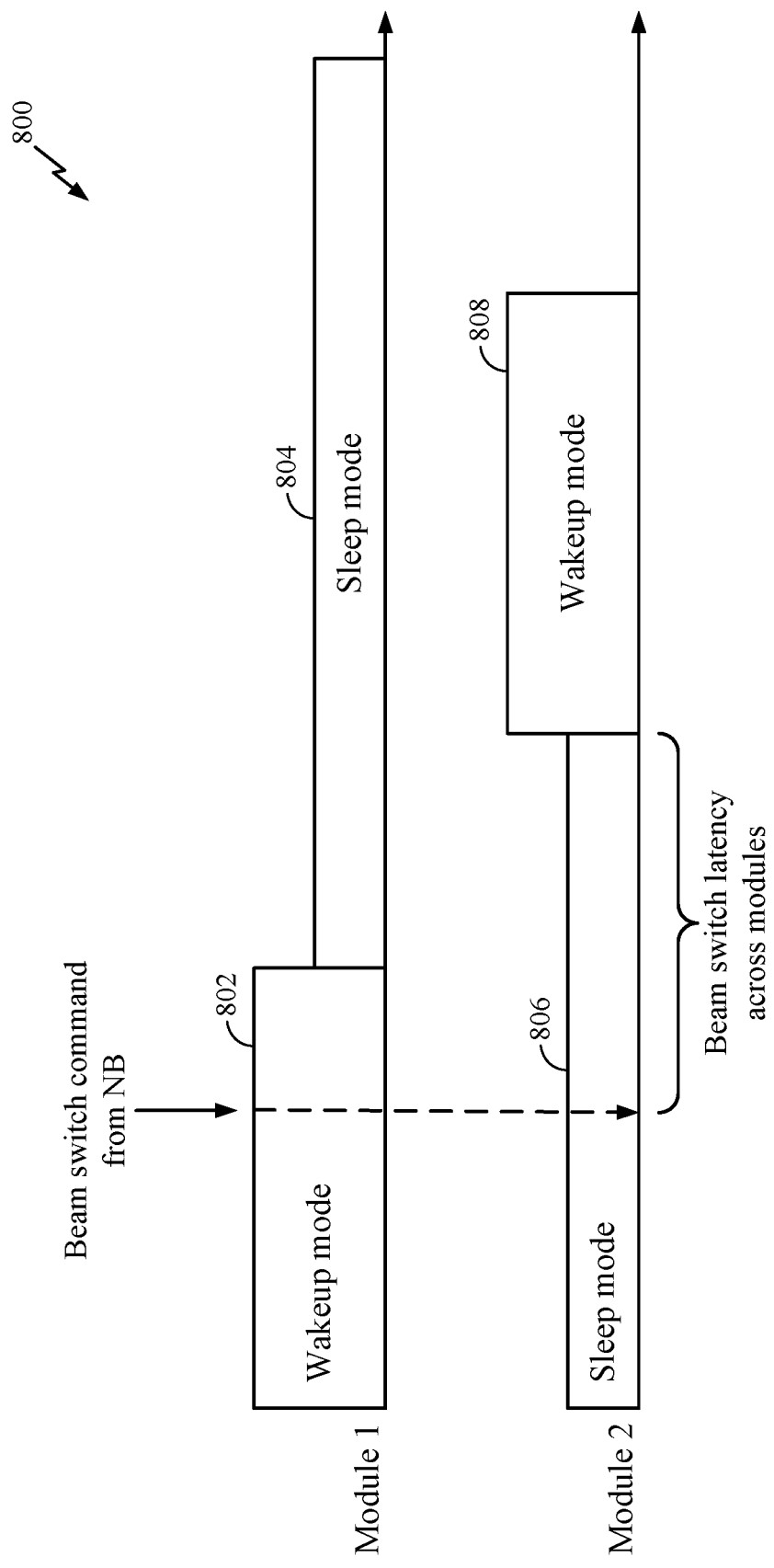
FIG. 8 illustrates an example of mode adjustments for antenna array modules over time, in accordance with aspects of the present disclosure.

An example of antenna array module mode switching and timing is shown in FIG. 8. FIG. 8 illustrates an example of mode adjustments 800 for antenna array modules (Module 1 and Module 2) over time, in accordance with aspects of the present disclosure.

As shown, Module 1 may begin in a wakeup mode 802 while module 2 may begin in a sleep mode 806. The module 1 may wake from the powered on (wakeup) mode 802 and transition into a low power (sleep) mode 804 which may occur while module 2 is still in its sleep mode 806. The module 2 may then transition from the sleep mode 806 to a wakeup mode 808 as shown.

Further, a beam switch command from a network entity (e.g., an NB) is shown being received at a time when the module 1 is in a wakeup mode 802 and the module 2 is in a sleep mode 806. Also indicated in FIG. 8 is an example of a beam switch latency across modules (from powered on Module 1 to Module 2 in sleep mode). As indicated, the beam switch latency corresponds to the time from when the beam switch command is received to when Module 2 is awake.

Unfortunately, without knowing if the target module for a beam switch is in a sleep mode, an NB may not know the corresponding beam switch time. Aspects of the present disclosure, however, provide a mechanism for a UE to indicate a beam switch latency. An NB may use this indicated latency, for example, to determine when the beam switch is complete and the UE is capable of processing a transmission (e.g., a measurement signal, such as a CSI-RS transmission).

Examples of Feedback of Beam Switch Time Capability

In accordance with one or more aspects disclosed herein, feedback of beam switch time capability of a UE is provided. In some cases, a UE may signal an indication of beam switch latency, which may help address scenarios such as the case of when a target module is in a sleep mode. In some cases, the indication may be provided as part of a UE capability exchange. In accordance with certain aspects disclosed herein, the UE may only feedback a maximum beam switch latency across all source/target module pairs, may dynamically signal beam switch latency per switch, or the UE may feedback a beam switch latency per target module.

Figure 9:
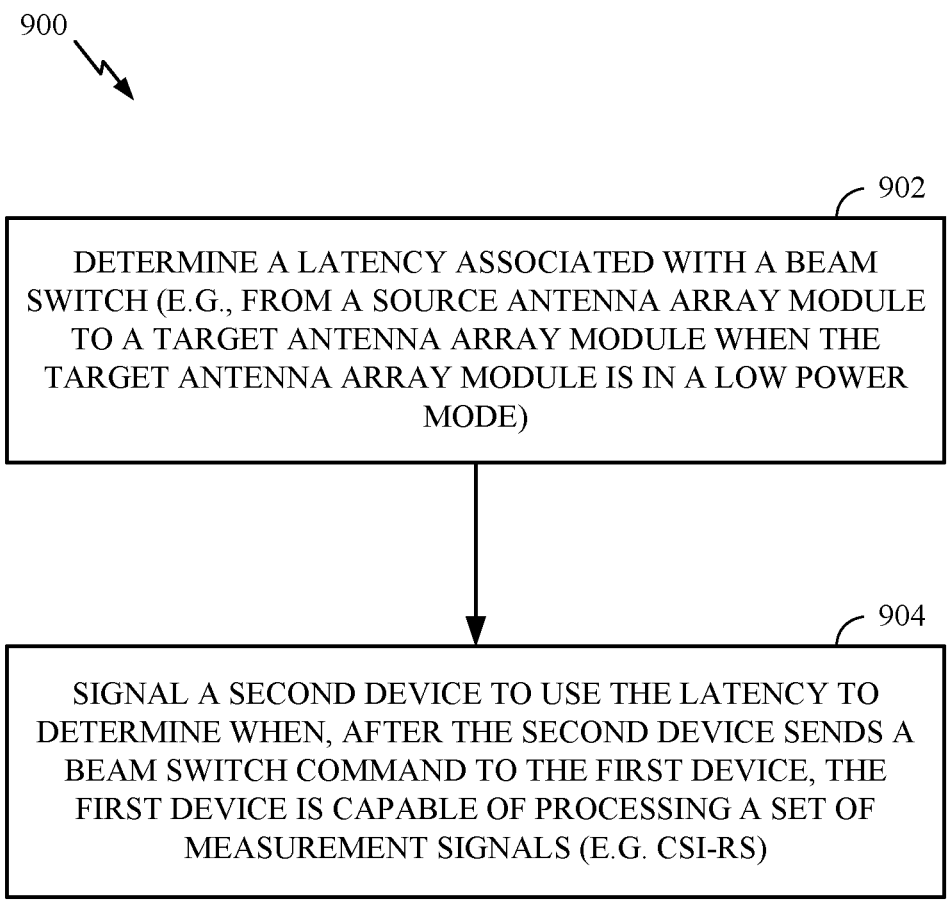
FIG. 9 illustrates example operations for wireless communications by a user equipment (UE), in accordance with aspects of the present disclosure.

FIG. 9 illustrates operations 900 for wireless communications that may be performed by a first device, such as a user equipment (UE), in accordance with aspects of the present disclosure. For example, operations 900 may be performed by UE 700 of FIG. 7 with multiple antenna array modules.

Operations 900 begin, at 902, by determining a latency associated with a beam switch from a source antenna array module to a target antenna array module when the target module is in a low power mode. At 904, the first device signals a second device to use the latency to determine when, after the second device sends a beam switch command to the first device, the first device is capable of processing a set of measurement signals. The set of measurement signals may include, for example, channel state information reference signals (CSI-RS), certain synchronization signals (e.g., carried in a SS block as shown in FIG. 6) used for measurement purposes, and/or any other type of measurement signals.

Figure 10:
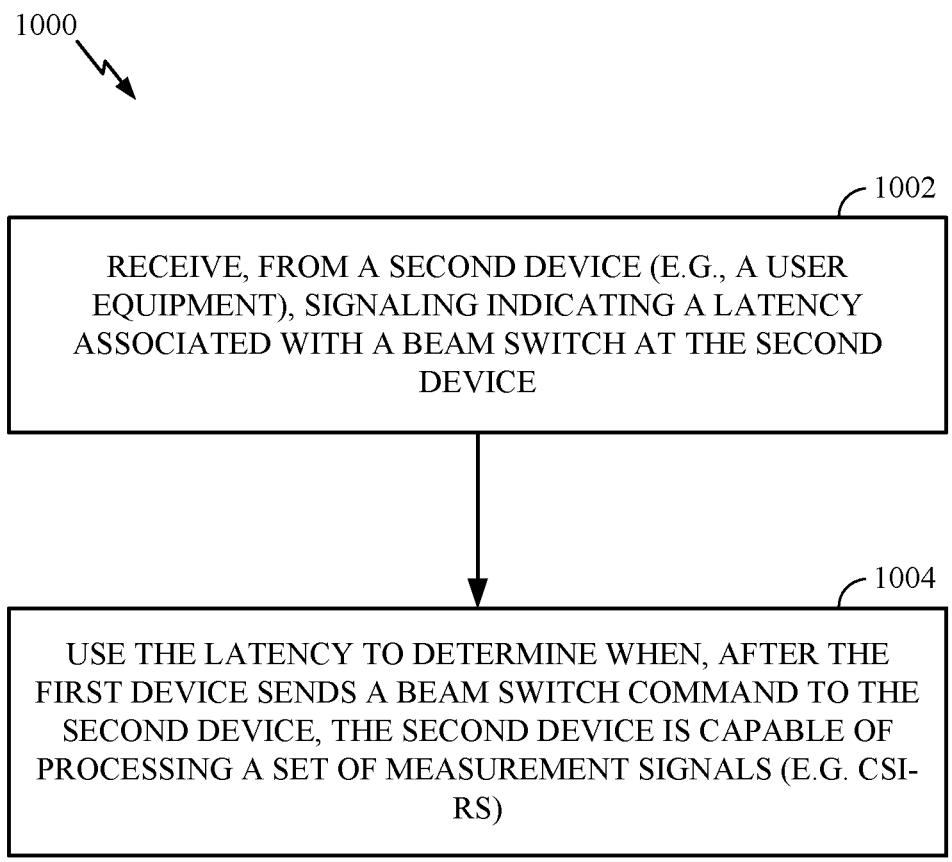
FIG. 10 illustrates example operations for wireless communications by a network entity, in accordance with aspects of the present disclosure.

FIG. 10 illustrates operations 1000 for wireless communications that may be performed by a first device (e.g., a network entity), in accordance with aspects of the present disclosure. For example, operations 1000 may be performed by a base station 110 of FIG. 4 serving a UE performing operation 900 of FIG. 9 described above.

Operations 1000 begin, at 1002, by receiving, from a second device, signaling indicating a latency associated with a beam switch at the second device. At 1004, the first device uses the latency to determine when, after the first device sends a beam switch command to the second device, the second device is capable of processing a set of measurement signals.

The latency indicated by a UE may indication a minimum processing time needed by the UE to perform the beam switch and be able to process a subsequent transmission after the switch. For example, if a downlink control information (DCI) transmission triggers an aperiodic CSI-RS (A-CSI-RS) transmission, the UE may only be able to process the CSI-RS transmission if a scheduling offset indicated in the DCI is greater than the minimum time for a beam switch latency.

Thus, if a UE has signaled one or more latency values, a NB (gNB) should configure A-CSI-RS at least this amount of time after the scheduling DCI. This may help ensure the UE has enough time to turn on/wake up all the antenna array modules (panels) that were asleep in order to receive A-CSI-RS transmissions simultaneously based on the indicated beam if the other scheduling DCI.

In some cases, a UE may signal a single time value that the UE uses needs to turn on one or multiple panels/for simultaneous reception. In some cases, rather than explicitly signal a latency value is for an inter-panel beam switch, a UE may simply signal the latency values. In such cases, a NB may infer the intended use when a UE signals a high number for the latency is that the UE wants sufficient time to turn on all panels (as opposed to switching beam in same panel). A UE may signal a value large enough to cover a beam switch across all panels, to provide enough time to turn on panels even from a deep sleep.

From the NB perspective, each value signaled for a beam switch latency may indicate that, when the NB signals the UE to switch beams, it needs to give the UE at least that much time before it can process the CSI-RS.

In some cases, the indicated latency may include a maximum beam switch latency for beam switches across all possible source and target antenna array module pairs. Further, the indicated latency may be fixed, and the network entity may always assume the indicated latency at least for all cross-module beam switches. Also, the UE may dynamically update the indicated latency based on a current power mode of the target antenna array module (e.g. longer latency is used if the module is in deep sleep mode than light sleep mode). If the UE provides no additional indication on which beam switches the indicated latency should be applied to, the base station may apply the indicated latency to all beam switches associated with the UE.

As an optimization, the indicated latency may only be applied to a cross-module beam switch with target module in sleep. Ideally, a beam switch within same module or across active modules may still use a default latency (e.g. <250 us). To achieve the optimization, a UE may need to inform the base station (NB) which beam switches should use indicated latency. In some cases, additional operations may be provided which may include, for example, indicating, to the base station, one or more pre-determined beam switches that should use the indicated latency. Further, the one or more predetermined beam switches may be signaled as a channel state information reference signal (CSI) ID or a CSI reference signal (CSI-RS) resource configuration ID.

In some cases, additional operations may be performed which may include, for example, indicating, to the base station, whether the indicated latency should be used per beam switch. Further, a beam switch command may be signaled via a media access control (MAC) control element (CE), and the UE may indicate whether or not the base station should use the indicated latency via an acknowledgment (ACK). In some cases, the UE may indicate, in advance, which beam switch is to a target antenna array module that is in a low power state. The indication of which beam switch is to a target antenna array module that is in a low power state may be provided via an index. For example, a UE may inform the base station that a UE beam index is associated with a module index, so the base station knows which beam switch is cross module. The UE beam index can be signaled via the resource ID of the reference signal with spatially quasi co-located relation with the UE beam, where the reference signal resource ID includes SRS resource ID (SRI), SS-block ID (SSB_ID), and CSI-RS resource ID. In addition, UE should may also signal the base station which target module is in a low power state via either explicit module power state feedback or implicit signaling, e.g. signaling the association between the UE beam indices with a module index implies this module is in low power state.

In some cases, the UE may dynamically signal a beam switch latency per beam switch (e.g., provide different latency values for different combinations of source and target beams). Further, the beam switch command may be signaled via a media access control (MAC) control element (CE), and the UE may indicate whether or not the network entity should use the indicated latency via an acknowledgment (ACK).

In some cases, the UE may signal a beam switch latency per target antenna array module. Further, the indicated latency per target module may be fixed. Additionally, additional operations may be performed that include, for example, updating the indicated latency (signaling an updated latency) per target module based on current module power state. For example, the UE may dynamically determine beam switch latency for a given target module based on whether or not that module is in a deep/light sleep. In addition, the UE may inform the base station the target module per beam switch in advance. For example, the UE may inform the base station that a UE beam index is associated with a module index, so the base station knows the target module per beam switch and hence applies the corresponding beam switch latency accordingly. As indicated above, the UE beam index can be signaled via the resource ID of the reference signal with spatially quasi co-located relation with the UE beam, where the reference signal resource ID includes SRS resource ID (SRI), SS-block ID (SSB_ID), and CSI-RS resource ID.

In some cases, the UE may signal a beam switch latency per type of beam switch. Further, each of multiple types of beam switches may have a corresponding beam switch latency, and the UE may feedback a beam switch latency per type, which may overwrite a corresponding default value. Each beam switch type may be defined in standards or negotiated between the base station and the UE, and may have a default latency value. In some cases, these types of beam switch latency may include, for example, 4 types of beam switch latencies associated with DCI triggered PDSCH, PUSCH, aperiodic-CSI-RS, or aperiodic-SRS beam switch in downlink or uplink, where the base station and UE will switch Tx and Rx beams for transmitting and receiving the 4 types of signals in downlink after the corresponding beam switch latency per type from the end of the triggering DCI to the finish of Tx and Rx beam switch.

In some cases, different types of beam switch latency may include, for example, a type of beam switch latency associated with DCI triggered aperiodic-CSI-RS with Tx beam repetition ON across the resources within the triggered aperiodic-CSI-RS resource set. When the repetition is ON, the base station will transmit the aperiodic-CSI-RS resource set with same Tx beam across all resources within the set, while the UE will measure the Tx beam quality per resource by using different Rx beams across different resources. In this way, the UE can figure out the best Rx beam associated with the fixed Tx beam, and this UE Rx beam refinement procedure is commonly named as P-3 procedure. The associated beam switch latency is defined from the end of the triggering DCI to the start of transmission and reception of aperiodic-CSI-RS resource set. UE can signal or update the desired beam switch latency for the P3 procedure to the base station, which will overwrite any existing default beam switch latency.

In some cases, these types of beam switch latency may include, for example, a type of beam switch latency associated with DCI triggered aperiodic-CSI-RS with Tx beam repetition OFF across the resources within the triggered aperiodic-CSI-RS resource set. When the repetition is OFF, the base station will transmit the aperiodic-CSI-RS resource set with different Tx beams across all resources within the set, while the UE will measure the Tx beam quality per resource by using same Rx beam across different resources. In this way, UE can figure out the best Tx beam associated with the fixed Rx beam, and this base station Tx beam refinement procedure is commonly named as P-2 procedure. The associated beam switch latency is defined from the end of the triggering DCI to the start of transmission and reception of aperiodic-CSI-RS resource set. UE can signal or update the desired beam switch latency for the P-2 procedure to the base station, which will overwrite any existing default beam switch latency.

In some cases, these types of beam switch latencies may include, for example, 4 types of beam switch latencies associated with MAC-CE triggered PDCCH, PUCCH, semi-periodic-CSI-RS, or semi-periodic-SRS beam switch in downlink, where the base station and UE will switch Tx and Rx beams for transmitting and receiving the 4 types of signals in downlink or uplink after the corresponding beam switch latency per type from the end of the triggering MAC-CE to the finish of Tx and Rx beam switch.

All previous mentioned beam switch latency could be sub-carrier spacing (SCS) dependent, i.e. UE can signal beam switch latency per SCS, e.g. 14 symbols for SCS=60 kHz, 28 symbols for SCS=120 kHz, 56 symbols for SCS=240 kHz. Other possible values (e.g., which may also depend on SCS) include 48, 224, or 336 symbols. As noted above, in some cases, a UE may not explicitly indicate a certain latency is associated with an inter-panel beam switch. Rather, a NB may infer that a larger latency value is for an inter-panel beam switch, while a smaller latency value is associated with an intra-beam switch.

In one or more cases, as part of a capability, a UE may feedback beam switch latency in order to help address a case when a target module is in a sleep mode. In one or more cases, one option may include a UE only feeding back the maximum beam switch latency across all source/target module pairs. In some cases, the indicated latency is fixed such that a NB may always assume this latency at least for all cross-module beam switches. In some cases, the indicated latency may be dynamically updated by a UE based on a current sleep status of modules. The UE may dynamically determine maximum latency based on which module is in a sleep and/or a deep/light sleep mode or state. An NB may assume this updated latency at least for all cross-module beam switches. If no additional indication on which beam switches the indicated latency should be applied, the NB may apply the indicated latency to all beam switches In some cases, as an optimization, the indicated latency may only be applied to cross-module beam switch with target module in sleep. In some cases, a beam switch within same module or across active modules can still use a default latency that may be, for example, less than 250 us.

In one or more cases, different options may be provided to inform an NB of which beam switches should use indicated latency. In some cases, a UE may inform the pre-determined beam switches that should use indicated latency. If a longer beam switch is desired, (e.g., for a P2/P3 beam management (BM) procedure), the UE may indicate the corresponding CSI-measId or CSI-RS-resourceConfigId, and the NB may then apply the indicated latency between corresponding DCI and AP-CSI-RS. In some cases, a UE may signal whether to use indicated latency or not per beam switch. For example, if a beam switch command is signaled in MAC-CE as for PDCCH and PUCCH, the UE may indicate it should use indicated latency or not in the ACK. In some cases, a UE may indicate in advance which beam switch is cross module with target module in sleep. For example, the UE may inform an NB that SRI/SSB_ID/CSI-RS_ID for indicating a UE beam is associated with a module index, so the NB may know which switch is cross module, and the target module should be in sleep if such association is signaled.

In some cases, instead of signaling single latency, a UE may indicate beam switch latency per target module. In some cases, the indicated latency per target module may be fixed. The NB may therefore always assume this latency for the given target module. In some cases, the indicated latency per target module may be dynamically updated by a UE based on current module sleep status. Thus, the UE may dynamically determine beam switch latency for this target module based on its sleep or not and deep/light sleep. In some cases, a UE may need to inform the NB the target module per beam switch in advance.

In one or more cases, instead of signaling single latency, multiple types of beam switch latency for various applications may be defined. Each beam switch type may therefore be configurable and may have a default latency value. A UE may then feedback the beam switch latency per type, which will overwrite the default value if it exists. In some cases, these types of beam switch latency may include, for example, DCI triggered PDSCH, PUSCH, AP-CSI-RS, or AP-SRS beam switch. In particular, the DCI triggered AP-CSI-RS beam switch may be further divided into 2 cases: resources in the triggered AP-CSI-RS resource set have repetition ON (for P3 BM) or OFF (for P1/P2 BM), which can have different beam switch latency configured. Another type of beam switch latency may include MAC-CE triggered PDCCH, PUCCH, SP-CSI-RS, or SP-SRS beam switch.

In one or more cases, all previously mentioned beam switch latency could be sub-carrier spacing (SCS) dependent. A UE can signal beam switch latency per SCS, e.g. 14 symbols for SCS=60 kHz, 28 symbols for SCS=120 kHz, 56 symbols for SCS=240 kHz.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components. For example, various operations shown in FIGS. 9 and 10 may be performed by various processors shown in FIG. 4. For example, operations 900 of FIG. 9 may be performed by one or more of processors of the UE 120 shown in FIG. 4, while operations 1000 may be performed by one or more processors of the base station 110 of FIG. 4.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for determining, means for performing, means for reporting, means for replacing, means for utilizing, and/or means for updating may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a first device, comprising:
    determining at least one latency associated with a beam switch at the first device, wherein the at least one latency is associated with the beam switch from a first antenna array module of the first device to a second antenna array module of the first device, wherein the at least one latency comprises at least one of: (1) a maximum latency of any inter-panel beam switch and intra-beam switch latencies of and between the first antenna array module and the second antenna array module, or (2) a delay for awaking the second antenna array module;
    signaling a second device to use the at least one latency for the second device to determine when, after the second device sends a beam switch command to the first device, the first device is capable of processing a set of measurement signals;
    receiving, from the second device, an indication triggering communication of at least one of the set of measurement signals; and
    receiving, from the second device, the at least one of the set of measurement signals, wherein the at least one of the set of measurement signals is delayed from the indication for at least the at least one latency.

2. The method of claim 1, where the set of measurement signals comprises channel state information reference signals (CSI-RS).

3. The method of claim 1, wherein the first device includes a user equipment (UE).

4. The method of claim 1, wherein the second device includes a base station (BS).

5. The method of claim 1, wherein the beam switch includes a reception beam switch in downlink receiving signal from the second device.

6. The method of claim 1, wherein the beam switch includes a transmission beam switch in uplink transmitting signal to the second device.

7. The method of claim 1, wherein the first device signals a beam switch latency per type of beam switch, the type of beam switching including at least one of an inter-panel beam switching or an intra-panel beam switching.

8. The method of claim 7, wherein:
    each of multiple types of beam switches have a corresponding beam switch latency; and
    the first device signals the second device to use a beam switch latency per type.

9. The method of claim 7, wherein:
    each of multiple types of beam switches have a corresponding default beam switch latency, which can be overwritten by the first device signaled beam switch latency per type.

10. The method of claim 7, wherein the types of latency comprise:
    a downlink control information (DCI) triggered beam switch in downlink.

11. The method of claim 10, wherein the DCI triggered beam switch in downlink includes a sequence of switched transmission beams at the second device, wherein each switched beam is used for transmitting each resource of an aperiodic channel state information reference signal resource set with the transmission beam repetition enabled across resources within the resource set.

12. The method of claim 10, wherein the DCI triggered beam switch in downlink includes a sequence of switched reception beams at the first device, wherein each switched beam is used for receiving each resource of an aperiodic channel state information reference signals resource set with the transmission beam repetition enabled across resources within the resource set.

13. The method of claim 10, wherein the DCI triggered beam switch in downlink includes a sequence of switched transmission beams at the second device, wherein each switched beam is used for transmitting each resource of an aperiodic channel state information reference signals resource set with the transmission beam repetition disabled across resources within the resource set.

14. The method of claim 10, wherein the DCI triggered beam switch in downlink includes a sequence of switched reception beams at the first device, wherein each switched beam is used for receiving each resource of an aperiodic channel state information reference signals resource set with the transmission beam repetition disabled across resources within the resource set.

15. The method of claim 1, wherein the first device signals a beam switch latency that depends, at least in part, on subcarrier spacing.

16. The method of claim 1, wherein the latency is associated with the beam switch from the first antenna array module to the second antenna array module when the second module is in a low power mode or a sleep mode, wherein the first antenna array module is a source antenna array module and the second antenna array module is a target antenna array module.

17. The method of claim 16, wherein the at least one latency comprises:
    a first latency associated with a beam switch from a beam associated with a source antenna array module of the first device to a beam associated with a target antenna array module of the first device; and
a second latency, less than the first latency, associated with a beam switch from a beam associated with the source antenna array module of the first device to another beam associated with the source antenna array module of the first device.

18. The method of claim 16, further comprising:
determining an updated value for the latency based on a current power mode of the target antenna array module; and
signaling the second device an indication of the updated value for the latency.

19. The method of claim 1, wherein:
the first device receives the beam switch command signaled via a media access control (MAC) control element (CE); and
the first device indicates, via an acknowledgment (ACK), whether or not the second device should use the indicated latency to determine when the first device is capable of processing the set of measurement signals.

20. A method for wireless communications performed by a first device, comprising:
receiving, from a second device, signaling indicating at least one latency associated with a beam switch at the second device, wherein the at least one latency is associated with the beam switch from a first antenna array module of the second device to a second antenna array module of the second device, wherein the at least one latency comprises at least one of: (1) a maximum latency of any inter-panel beam switch and intra-beam switch latencies of and between the first antenna array module and the second antenna array module, or (2) a delay for awaking the second antenna array module; and
using the latency to determine when, after the first device sends a beam switch command to the second device, the second device is capable of processing a set of measurement signals wherein using the latency comprises:
transmitting, to the second device, an indication triggering communication of at least one of the set of measurement signals; and
transmitting, to the second device, the at least one of the set of measurement signals, wherein the at least one of the set of measurement signals is delayed from the indication for at least the at least one latency.

21. The method of claim 20, where the set of measurement signals comprises channel state information reference signals (CSI-RS).

22. The method of claim 20, wherein the first device includes a base station (BS).

23. The method of claim 20, wherein the second device includes a user equipment (UE).

24. The method of claim 20, wherein the beam switch includes reception beam switch in downlink.

25. The method of claim 20, wherein the beam switch includes transmission beam switch in uplink.

26. The method of claim 20, wherein the second device signals a beam switch latency per type of beam switch.

27. The method of claim 26, wherein:
each of multiple types of beam switches have a corresponding beam switch latency; and
the second device feeds back a beam switch latency per type, the type including at least one of an inter-panel beam switching or an intra-panel beam switching.

28. The method of claim 26, wherein:
each of multiple types of beam switches have a corresponding default beam switch latency, which can be overwritten by the second device signaled beam switch latency per type.

29. The method of claim 26, wherein the types of latency comprise:
a downlink control information (DCI) triggered beam switch in downlink.

30. The method of claim 29, wherein the DCI triggered beam switch in downlink includes a sequence of switched transmission beams at the first device, wherein each switched beam is used for transmitting each resource of an aperiodic channel state information reference signals resource set with the transmission beam repetition enabled across resources within the resource set.

31. The method of claim 29, wherein the DCI triggered beam switch in downlink includes a sequence of switched reception beams at the second device, wherein each switched beam is used for receiving each resource of an aperiodic channel state information reference signals resource set with the transmission beam repetition enabled across resources within the resource set.

32. The method of claim 29, wherein the DCI triggered beam switch in downlink includes a sequence of switched transmission beams at the first device, wherein each switched beam is used for transmitting each resource of an aperiodic channel state information reference signals resource set with the transmission beam repetition disabled across resources within the resource set.

33. The method of claim 29, wherein the DCI triggered beam switch in downlink includes a sequence of switched reception beams at the second device, wherein each switched beam is used for receiving each resource of an aperiodic channel state information reference signals resource set with the transmission beam repetition disabled across resources within the resource set.

34. The method of claim 20, wherein the second device signals a beam switch latency that depends, at least in part, on subcarrier spacing.

35. The method of claim 20, wherein the latency is associated with the beam switch from the first antenna array module of the second device to the second antenna array module of the second device when the target module is in a low power mode or sleep mode, wherein the first antenna array module is a source antenna array module and the second antenna array module is a target antenna array module.

36. The method of claim 35, wherein:
the at least one latency comprises at least a first latency and a second latency shorter than the first latency;
the first device is configured to select the first latency to determine when the second device is capable of processing the set of measurement signals if the beam switch command is to switch from a beam associated with a source antenna array module of the second device to a beam associated with a target module of the second device; and
the first device is configured to select the second latency to determine when the second device is capable of processing the set of measurement signals if the beam switch command is to switch from a beam associated with the source antenna array module of the second device to another beam associated with the source antenna array module of the second device.

37. The method of claim 35, further comprising receiving signaling from the second device indicating an updated latency based on a current power mode of the target antenna array module of the second device.

38. The method of claim 20, wherein:
- a beam switch command is signaled via a media access control (MAC) control element (CE); and
- the second device indicates whether or not the second device should use the indicated latency via an acknowledgment (ACK).

39. An apparatus for wireless communications by a first device, comprising:
- means for determining at least one latency associated with a beam switch at the first device, wherein the at least one latency is associated with the beam switch from a first antenna array module of the first device to a second antenna array module of the first device, wherein the at least one latency comprises at least one of: (1) a maximum latency of any inter-panel beam switch and intra-beam switch latencies of and between the first antenna array module and the second antenna array module, or (2) a delay for awaking the second antenna array module;
- means for signaling a second device to use the at least one latency for the second device to determine when, after the second device sends a beam switch command to the first device, the first device is capable of processing a set of measurement signals;
- means for receiving, from the second device, an indication triggering communication of at least one of the set of measurement signals; and
- means for receiving, from the second device, the at least one of the set of measurement signals, wherein the at least one of the set of measurement signals is delayed from the indication for at least the at least one latency.

40. An apparatus for wireless communications by a first device, comprising:
- means for receiving, from a second device, signaling indicating at least one latency associated with a beam switch at the second device, wherein the at least one latency is associated with the beam switch from a first antenna array module of the second device to a second antenna array module of the second device, wherein the at least one latency corresponds to a time between when a beam switch command is received in the first antenna array module and when the second antenna array module becomes awake;
- means for using the latency to determine when, after the first device sends a beam switch command to the second device, the second device is capable of processing a set of measurement signals;
- means for transmitting, to the second device, an indication triggering communication of at least one of the set of measurement signals; and
- means for transmitting, to the second device, the at least one of the set of measurement signals, wherein the at least one of the set of measurement signals is delayed from the indication for at least the at least one latency.

* * * * *